United States Patent

Gizopoulos et al.

[11] Patent Number: 5,960,009
[45] Date of Patent: Sep. 28, 1999

[54] BUILT IN SHELF TEST METHOD AND APPARATUS FOR BOOTH MULTIPLIERS

[75] Inventors: Dimitris Gizopoulos; Antonis Paschalis, both of Athens, Greece; Yervant Zorian, Princeton, N.J.

[73] Assignee: Lucent Technologies Inc., Murray Hill, N.J.

[21] Appl. No.: 08/694,881

[22] Filed: Aug. 9, 1996

[51] Int. Cl.$^6$ ..................................................... G01R 31/28
[52] U.S. Cl. ........................ 371/27.5; 371/27.7; 371/27.1
[58] Field of Search ................. 371/27.1, 27.5, 371/27.7, 22.5, 22.6, 24, 25.1; 364/238, 232.8, 247.1, 258.2, 264, 264.7, 265

[56] References Cited

U.S. PATENT DOCUMENTS

| | | | |
|---|---|---|---|
| 4,682,331 | 7/1987 | Mori | 371/25.1 |
| 4,807,175 | 2/1989 | Tokumaru et al. | 364/760 |
| 4,866,715 | 9/1989 | Van Meerbergen et al. | 371/27.1 |
| 5,285,453 | 2/1994 | Gruodis | 371/27.1 |
| 5,390,192 | 2/1995 | Fujieda | 371/27.1 |
| 5,420,870 | 5/1995 | Kim | 371/27.1 |
| 5,600,658 | 2/1997 | Qureshi | 371/22.1 |

OTHER PUBLICATIONS

Shen, T. et al. "The Design of Easily Testable VLSI Array Mulipliers" IEEE Transaction of Computers, vol. C–33, No. 6, pp. 554–560, Jun. 1984.

Stans, "The Testability of a Modified Booth Multipliers," Proc. of 1st European Test Conference ETC '89, pp. 932–942, Apr. 1989.

van Sas et al., "Design of a C–testable Booth Mulitplier Using a Realistic Fault Model," Journal of Electronic Testing: Theory and Applications, vol. 5, No. 1, pp. 29–41, Feb. 1994.

Waller et al., "A C–testable Parallel Multiplier Using Differential Cascode Voltage Switch (DCVS) Logic," IFIP Transactions A, vol. A–42, pp. 133–142, 1994.

Gizopoulos et al., "C–testable Multipliers Based on the Modified Booth Algorithm," Proc. 3rd Asian Test Symposium, pp. 163–168, Nov. 1994.

*Primary Examiner*—Hoa T. Nguyen

[57] ABSTRACT

A Built-In Self Test (BIST) method and apparatus for Booth multipliers, wherein a fixed-size (8-bit) binary counter is used along with accumulator-based output data compaction. The fault model adopted enables a BIST algorithm which is independent of specific gate level implementations of the multiplier cells. The generated 256 test vectors guarantee more than 99% single stuck-at fault coverage. A new accumulator-based compaction scheme is introduced to provide less aliasing and thus higher compaction quality than existing accumulator-based approaches. No design for testability modifications to the multiplier are required and method is totally applied on the periphery of the multiplier structure therefor causing no internal performance degradation. The BIST scheme of the present invention is generic and can be applied to any Booth multiplier derived by any module generator.

39 Claims, 4 Drawing Sheets

BUILT IN SHELF TEST METHOD AND APPARATUS FOR BOOTH MULTIPLIERS

FIELD OF THE INVENTION

The present invention relates generally to Built In Self Test Devices for regular arithmetic structures and more particularly to a method and apparatus for a Built in Self Test (BIST) for modified Booth multipliers.

BACKGROUND OF THE INVENTION

Array multipliers are often used in critical parts of complex digital circuits, such as Digital Signal Processors (DSPs), because of their circuit area and speed. They are often efficiently implemented in Very Large Scale Integration (VLSI) devices if they are built of regular two-dimensional Iterative Logic Arrays (ILAs) and not as tree-like multipliers. Their operation can essentially be divided in two parts. The first is the calculation of a set partial products and the second is the summation of these products to form the final product of the multiplication.

It is widely known to implement such multiplier operations within a data processor by utilizing a multiplier recoding algorithm. The purpose of a recoding algorithm is to reduce the number of addition operations, which determine the partial products required to complete a processor multiplier instruction. A conventional add-shift multiplier operation that has an M-bit multiplicand operand and an N-bit multiplier operand, where M and N are integers, typically requires an N-number of additional operations to complete a processor multiplier instruction. By utilizing a recoding algorithm such as Booth's recoding algorithm or a modified Booth's recoding algorithm, the number of additional operations required to complete the multiplier instruction can be significantly reduced.

A multiplier that utilizes Booth's recoding algorithm is taught by Tokumaru et al in U.S. Pat. No. 4,807,175, entitled "Booth's Multiplier," which is incorporated by reference herein. Tokumaru et al utilize two separate adder units to calculate two separate intermediate partial products, then sum the two separate intermediate partial products with a previously formed full partial product in two additional adder units to calculate each new full partial product.

Because the Booth algorithm uses a special technique to perform multiplication, array multipliers based on it are faster and require less area compared to other types of array multipliers. Both standard array multipliers and modified-Booth array multipliers, due to their highly defined structure, can be efficiently tested, if they are either linear-testable, (i.e. tested with a number of test vectors increasing linearly with the size of the multiplier), or C-testable, (i.e. tested with a constant number of test vectors irrespective to the size of the multiplier). The testability of standard array multipliers has been studied and explained in such publications as, Shen et al, "The Design of Easily Testable VLSI Array Multipliers," *IEEE Transaction of Computers*, Vol. C-33, No. 6, pp. 554–560, June 1984. In such publications, efficient test sets of either linear or constant size have been extracted and specific Design-For-Testability (DFT) techniques have been known.

A specific example of such a test scheme is taught by Van Meerbergen, et al, U.S. Pat. No. 4,866,715, issued Sep. 12, 1989, which is incorporated by reference herein, wherein it is taught to test a modified Booth multiplier by multiplying an m-bit value X=x(m−1) . . . x(1) x(0), where x(0) is the least-significant bit, by an n-bit value Y=y(n−1) . . . y(1) y(0), where y(0) is the least-significant bit. The Van Meerbergen modified Booth multiplier uses a Booth encoder in which the n-bit value is converted into a series of multiplication values (Y'=y'(k−2) . . . y'(2) y'(0), where k=n if n is even and k=n+1 if n is odd. The conversion occurs in groups of 3 bits, which overlap each time by one bit. The groups of 3 bits take the form y(i−1) y(i) y(i+1), where i=0, 2, 4, . . . n−2, if n is even and i=0, 2, 4, . . . n−1, if n is odd. The bits y(−1) and, if n is odd, y(n) have adjustable values. The Van Meerbergen modified booth multiplier further uses a multiplex circuit for forming partial products (X.y' (j)), and a matrix configuration of full adders for adding the successively obtained partial products in incremental positions. By this method, a number of test patterns are obtained in the modified Booth multiplier on the basis of specifically applied X,Y values. The test patterns produce values, on an output of the modified Booth multiplier, that reveal whether the modified Booth multiplier is defective. For a modified Booth multiplier having a substantial number of bits to be processed, however, the number of feasible test patterns is so large that the Van Meerbergen method of testing is not very efficient and often even impracticable.

Other DFT approaches for modified-Booth multipliers are also found in such publications as Stans, "The Testability of a Modified Booth Multiplier," *Proc. Of $1^{st}$ European Test Conference ETC '89*, pp. 932–942, April 1989; van Sas et al, "Design of a C-testable Booth Multiplier Using a Realistic Fault Model," *Journal of Electronic Testing: Theory and Applications*, Vol. 5, No. 1, pp. 29–41, February 1994; Waller et al, "A C-testable Parallel Multiplier Using Differential Cascode Voltage Switch (DCVS) Logic," *IFIP Transactions A*, Vol. A-42, pp. 133–142, 1994; and Gizopoulos et al, "C-testable Multipliers Based on the Modified Booth Algorithm," *Proc. $3^{rd}$ Asian Test Symposium*, pp. 163–168, November 1994.

Most of these publications base their approaches on the assumption that specific implementations of the multiplier cells use either a silicon compiler or a standard DCVS logic. The last publication is based on independent specific implementations of the multiplier cells. DFT modifications are used in the above cited publications to make the multiplier C-testable and provide a small test set regardless of the operands lengths. The test sets of all these publications are meant to be externally stored and applied to the multiplier under test and their output response externally evaluated. The application of these types of approaches to multipliers embedded in complex designs is very difficult due to the low controllability and observability of the multipliers and due to the expense of such approaches in terms of hardware implementation because of the irregularity of both input test sets and their output responses.

Therefore, there exists a need in the art to provide an efficient BIST scheme for embedded multipliers as well as for other embedded structures, such as RAMS, ROMS, FIFOs, etc., so as to allow at-speed testing (i.e. operating system speed), provide very high fault coverage and drive down the cost of testing for the overall circuit. The present invention addresses such a need.

SUMMARY OF THE INVENTION

Accordingly, the present invention is directed to a generic Built In Self Test (BIST) method and apparatus for testing the operation of structures, such as modified booth multipliers, that perform arithmetic operations on a set of operands, wherein the arithmetic structures include those that use a carry propagate array of adders to add-up partial products. To achieve this, the present invention interfaces a test-pattern generator (TPG) block with the arithmetic structure such that the TPG generates a test set that provides greater than ninety-nine percent fault coverage, regardless of the size of the arithmetic structure. As a result, both the cost of the (TPG) hardware and the test application time are constants.

According to one embodiment of the present invention, a TPG block consisting of an 8-bit counter and a set of multiplexers is synthesized with a modified booth multiplier such that the counter generates 256 successive test vectors to test the operation of the booth multiplier at the system operating speed. The counter provides a test set pattern with a high degree of regularity (i.e. counting, in succession, from zero to 256) at the system operating speed, and thus provides substantially increased testing efficiency over the prior art.

Moreover, the TPG can be configured such that it provide the means for exhaustively testing all of the cells of the booth multiplier. That is, the TPG can consist of a counter having a size that generates every input combination that can appear in the normal mode of the booth multiplier, regardless of the size of the multiplier.

In one embodiment, the inputs of a set of multiplexers can be coupled to the X and Y operands to be applied to the booth multiplier and to the TPG (e.g. an 8-bit counter), wherein the multiplexer output is coupled to the recoding and partial products and adder arrays of the Booth multiplier. Such a structure enables the passing of either the test bits from the TPG or the actual X and Y inputs to be operated and output through the booth multiplier. The booth multiplier output is then directed through an accumulator which can also be used as an output data compaction processor.

With the above configuration having an 8-bit counter, however, there would be a small subset of half-adders, which receive 3 of the 4 possible input combinations from the counter, that would not be tested. In a preferred embodiment of the present invention, however, this is remedied by applying the missing input combinations to a set of half-adders. This requires synthesizing two extra modules with the TPG hardware without modifying the multiplier structure. Although this additional hardware linearly increases the size of the TPG and the test set length with the multiplicand size, the TPG of the present invention still provides a substantially reduced structure in the face of the prior art.

As a result, the device and method of the present invention substantially increases the fault coverage without increasing the size, cost and complexity of the hardware, as in the prior art.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION OF THE ILLUSTRATIVE EMBODIMENTS

In order to fully understand the present invention a description of the operation of the architecture of a modified Booth multiplier according to the present invention is necessary.

Booth Multiplier Operation

Standard $N_x$, X $N_y$ array multipliers calculate one $N_y$-bit partial product for each one of the $N_x$ bits of the multiplier operand. The summation of these $N_x$ partial products is implemented using an array of adders. Modified Booth multipliers reduce the number of partial products that must be added together by recoding one of the two operands. Groups of k bits (k>=2) of the recoded operand are treated together to produce one partial product. The partial products are reduced from $N_x$ to $$\left\lceil \frac{N_x}{2} \right\rceil$$

therefore speeding up multiplication.

Figure 1:
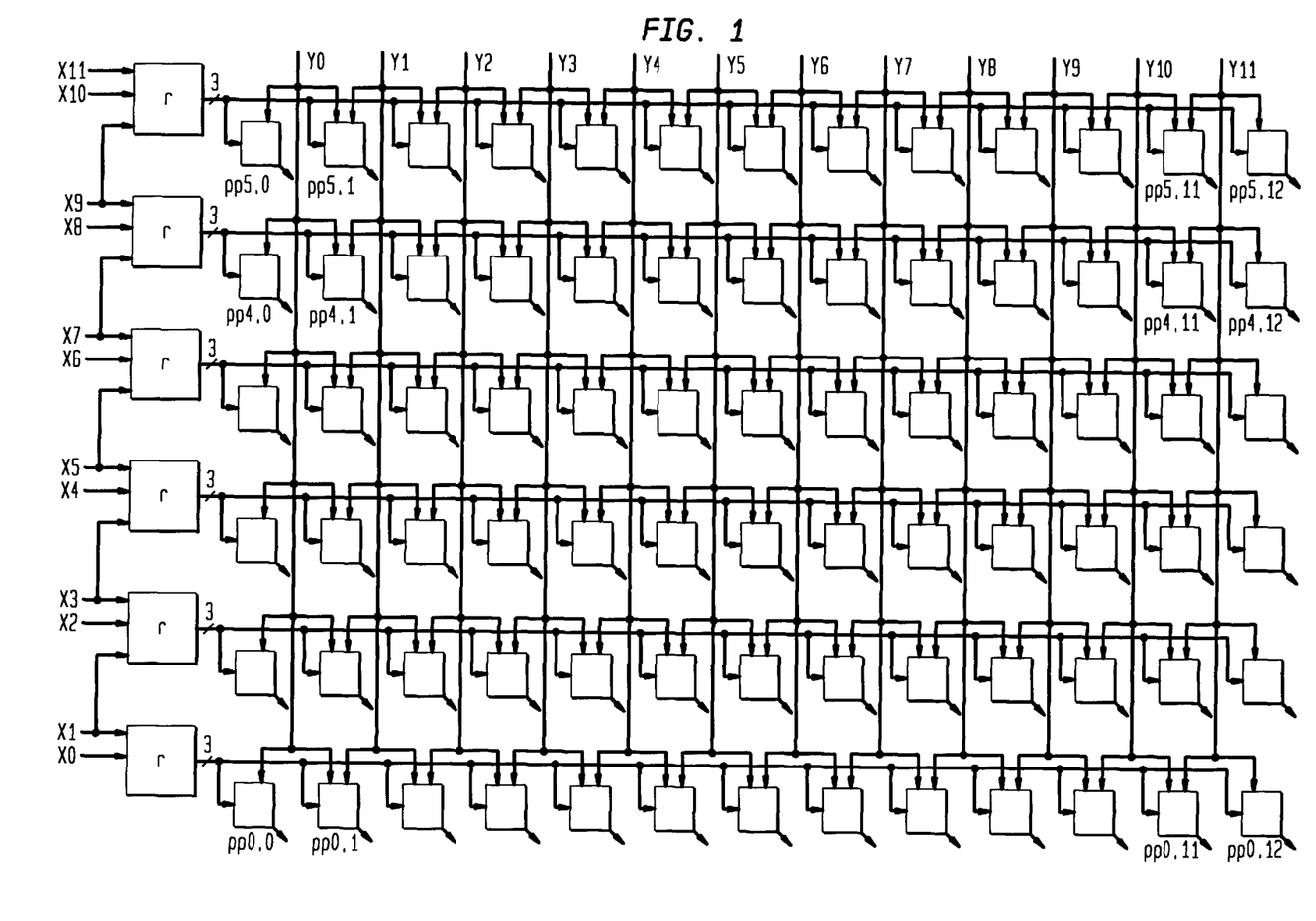
FIG. 1 is a schematic illustration of the recoding cells (left column) and partial product cells of a 12×12 modified Booth multiplier.
Figure 2:
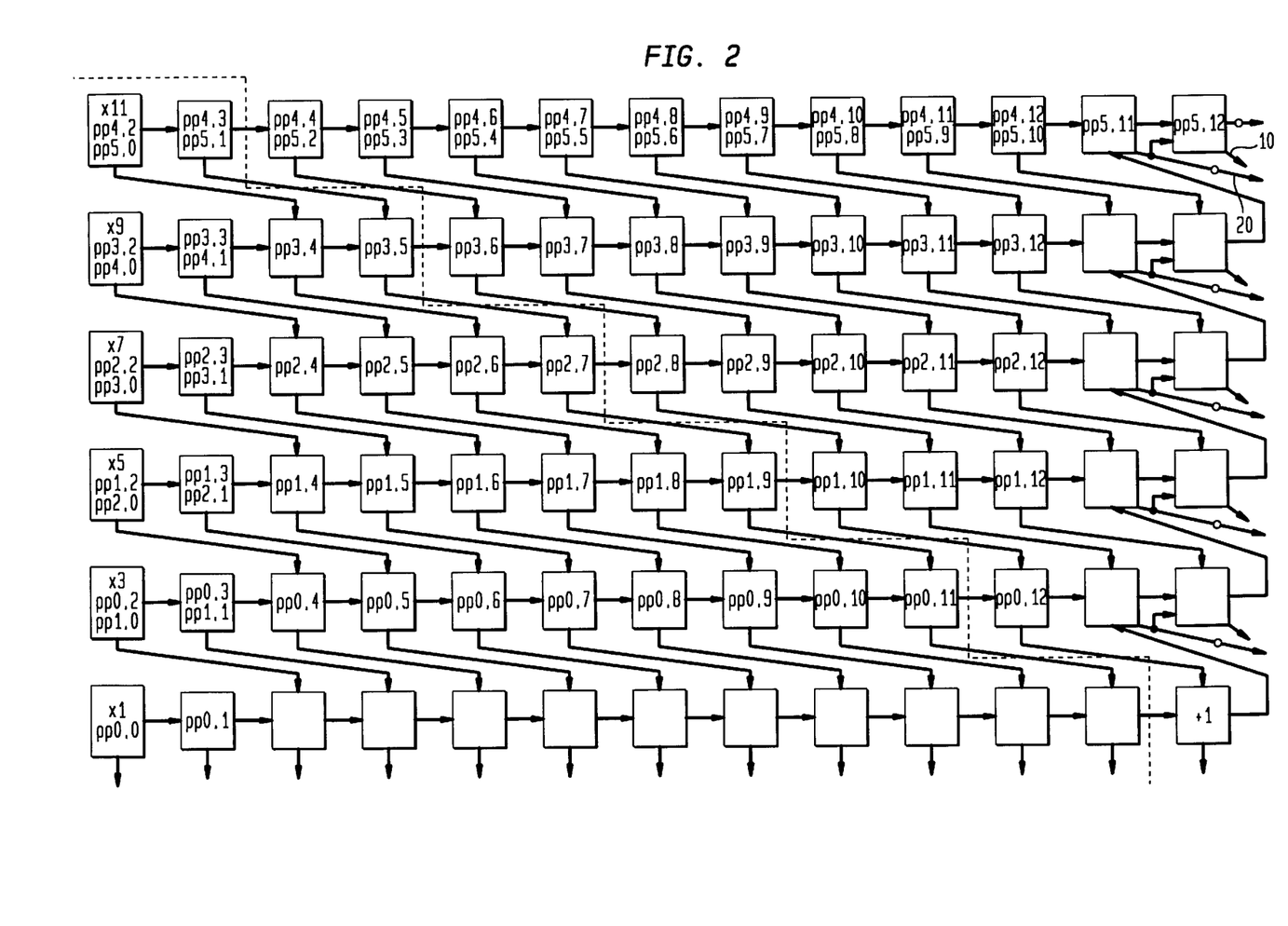
FIG. 2 is a schematic illustration of the adders array summing up the partial products (bottom row consists of half adders) of a 12×12 modified Booth multiplier.

The modified Booth multiplier with 2-bit recoding (k=2) consists of 3 types of functional cells. The overall architecture of a 12×12 bits multiplier is shown in FIGS. 1 and 2, as an example. As shown in FIGS. 1 and 2, the overall architecture consists of three types of cells termed r-cells, pp-cells and adders.

The first type of cells are termed r-cells, shown on the left side of FIG. 1 as blocks marked "r," and perform the recoding function. They receive a group of 2 bits ($X_{2j}$, $X_{2j+1}$, j =0,1, ... , $$\left\lceil \frac{N_x}{2} \right\rceil - 1 \Big)$$

of the recoded operand X, along with most significant bit of the previous group ($X_{2j-1}$). For the top-most r-cell (blocks r in FIG. 1), the group of 2 bits are marked X11 and X10 and the most significant bit of the previous bit is marked X9. R-cells produce a set of recoding signals ($Sign_j$, $One_j$, $Two_j$) representing the operation that must be performed over the non-recoded operand Y (+0Y, −0Y, +1Y, −1Y, +2Y, −2Y) at row j (the $X_{2j-1}$ input for the r-cell of row 0 is always 0, so this cell is reduced to a simpler 2-input cell instead of a 3-input cell, as shown in FIG. 1). Digits +0, −0, +1, −1, +2, −2 are termed recoded digits. Using these recoding digits, all partial products are produced with trivial and, therefore, fast operations like inversion (to have −Y) and shifting (to have 2Y). This is the reason why 2-bit recoding is preferred over larger recoding schemes, like 3-bit recoding, which requires non-trivial operations such as the production of 3Y.

The second type of cells are termed pp-cells. These are shown in FIG. 1 by labeling the first and last two of each column and each row (i.e. those blocks marked as pp5,0; pp5,1 and pp4,0; pp4,1). The pp-cells calculate the partial products that must be added to form the final product. The pp-cell at row j (j=0,1, ... , $$\left\lceil \frac{N_x}{2} \right\rceil - 1 \Big)$$

and column i (i=0,1, ... , $N_y$) receives the three recoded signals from the corresponding recoding cell (r-cell) of row j ($Sign_j$, $One_j$, $Two_j$), along with a pair of bits of the non-recoded Y operand ($Y_i$, $Y_{i-1}$) to calculate the partial product bit at this position ($pp_{j,i}$). This is a 5-input/single-output combinational function. The pp-cells of column 0 and $N_y$ receive only one bit of the Y operand ($Y_0$ and $Y_{Ny-1}$, respectively), so they can be reduced to simpler 4-input cells, instead of 5-input cells.

The last type of cells used in a modified Booth multiplier are the adder cells. These adder cells are shown in schematic form in FIG. 2 and are used to add up the partial products produced by the pp-cells. As shown in FIG. 2, the adders of the array are connected in a carry-propagate fashion and each adder cell is marked with the appropriate product from the pp-cells of FIG. 1. The adders of the bottom row of FIG. 2 are half-adders and all the remaining are full adders.

Since the modified Booth algorithm is used for numbers in 2's complement form, a sign extension action must take place for the proper addition of the partial products. In the present invention, sign extension is solved by adding a constant value to the adders producing the last $N_x$ bits of the products. This is the reason why a "+1" is added at the rightmost half-adder (bottom right of FIG. 2) and why the sum outputs of the full adder at column $N_{y-1}$ (represented by arrows 10) are connected to an input of the full adder at their right, and also inverted to give the corresponding product bit (represented by arrows 20).

Multiplier Fault Model

Previously, the building cells of a modified Booth multiplier were described. Since the present invention is based on the exhaustive testing (i.e. applying every input combination that can appear during normal mode) of arithmetic structures such as a booth multiplier, such testing of the cells of the booth multiplier are now described.

For purposes of this description, it is assumed that only one cell can be faulty at a time and that only combinational faults can happen. Adopting this fault model, all detectable combinational faults (i.e. all faults that can change the function of the single faulty cell to any other combinational function which can impact the correct operation on the multiplier) are cured. The set of faults included in the adopted fault model is a superset of the set of all single stuck-at faults. It also includes any other type of single or multiple fault, that can appear in the single faulty cell and can change its function to a different combinational one.

The set of input combinations according to the present invention that each type of cells requires is given in the following:

r-cells: An exhaustive test for an r-cell requires all the 8 different input combinations of its 3 inputs $X_{2j-1}$, $X_{2j}$, $X_{2j+1}$. The r-cell of row 0 which always receives $X_{2j-1}=0$ is reduced to a simpler non-redundant 2-input cell. Its exhaustive test requires the 4 different combinations of its 2 inputs.

pp-cells: Each pp-cell receives from the corresponding r-cell a set of three recoded signals which represent a recoded digit (+0, -0, +1, -1, +2, -2) and a pair of bits of the non-recoded operand $Y_i$, $Y_{i-1}$. An exhaustive test for a pp-cell requires all combinations of each recoded digit with each one of the 4 different combinations of $Y_i$, $Y_{i-1}$. The pp-cells of column 0 receive only bit $Y_0$ and the pp-cells of column $N_y$ receive only bit $Y_{Ny-1}$. An exhaustive test of these pp-cells requires all combinations of each recoded digit with each one of the 2 binary values of input $Y_0$ (respectively $Y_{Ny-1}$).

Adders: an exhaustive test for full adders requires the 8 input combinations of its 3 inputs and an exhaustive test of a half adder requires 4 input combinations of its 2 inputs.

Accordingly, using the above fault model, the testing mechanism of the present invention is independent of specific cell implementations. Therefore, any internal realization of the multiplier cells can be used. Even if the recoded digits produced by the recoding cells (which are not represented with 3 signals (Sign, One, Two) as in the present invention, but rather with 4 signals ($xP_1$, $xM_1$, $xP_2$, $xM_2$, representing recoded digits +1, -1, +2, -2, respectively)), the testing mechanism of the present invention still functions and every pp-cell will receive all combinations required by the fault model of the present invention.

Usually multiplier designs have optimized layouts since they are critical modules of a circuit due to their circuit area and speed. Since Design-for-Testability modifications inside a multiplier structure may add extra hardware overhead and lead to performance degradation, it is preferable to avoid such modifications where possible. The BIST for modified Booth Multipliers according to the present invention does not require any such modification of the multiplier structure since a TPG is used and an output data compactor (as will be described later) augments the periphery of the multiplier (See FIG. 3).

Figure 3:
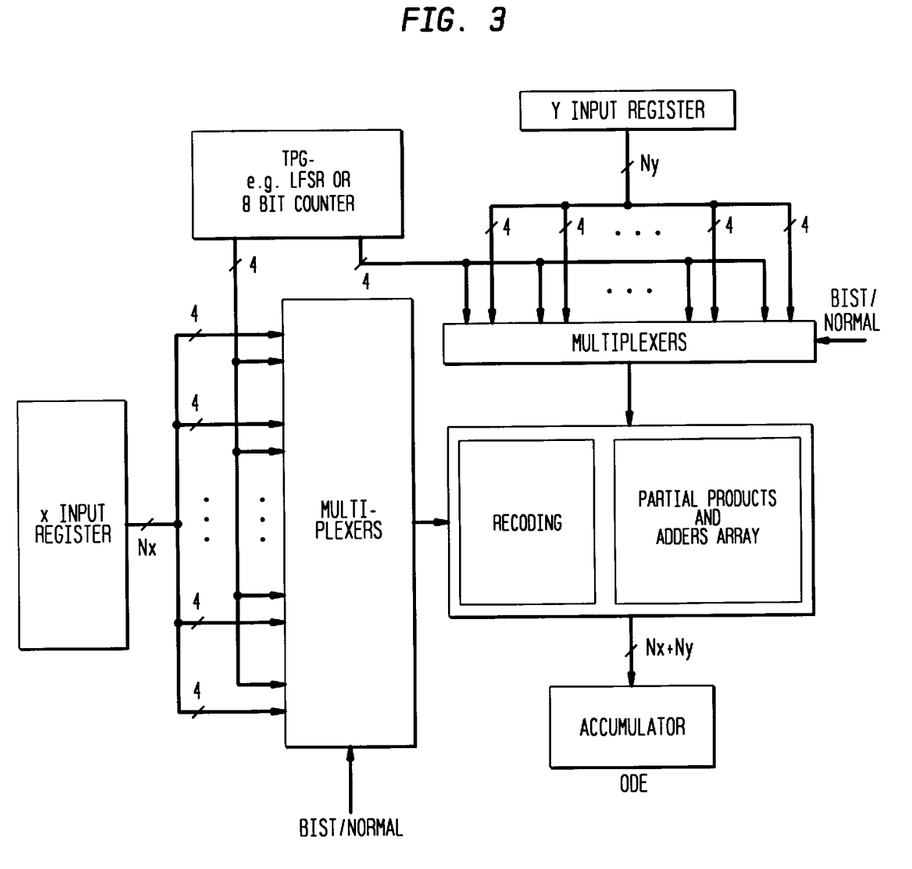
FIG. 3 is a block diagram of the BIST architecture according to the present invention.

In FIG. 3, the input data registers for the two operands, X and Y, are input into the two sets of multiplexers, as shown as Nx and Ny, respectively. The two sets of multiplexers at the top and left sides, Ny and Nx, respectively, of the multiplier array are used for the selection between normal and BIST multiplier inputs. This is represented in FIG. 3 by both input data registers for both operands and the BISTs for both operands being input into both sets of multiplexers. The output of the multiplexers are then input into the recoding and partial product and adders array as described above for the modified Booth multiplier.

Test pattern generation requirements for the BIST according to the present invention are significantly different than for external testing strategies. Conventional external testing requires the number of test vectors to be as small as possible because they are stored in tester memory and are often applied at low speed. Therefore, a larger number of test vectors necessarily involves increased testing time and cost of testing.

However, in the present invention the BIST test vectors are applied at the normal operating (system) speed and are produced (and not stored) on-chip. This means that test vectors need to have high regularity so that small machines can generate them. In the present invention, the TPG for an N,XNY bits modified-Booth multiplier described above can be any device that generates substantially all the possible vectors that can be input to the Booth multiplier. For example, the TPG can be a counter that sequentially provides every possible input vector to the Booth multiplier to be tested, or the TPG can be a linear feedback shift register (LFSR) that randomly generates every possible input vector to the device under test.

As shown in FIG. 3, an 8-bit counter is used to generate the test vectors for the multiplier. That is, four outputs of the 8-bit counter are used to generate the X inputs for the multiplier and the remaining four are used to provide the Y inputs. In one testing session of the multiplier, the 8-bit counter goes through all its 256 cycles and provides the test vectors to the multiplier through the circuitry shown.

For purposes of this Description, the counter outputs which are used as X inputs will be denoted as: $X_{BIST0}$, $X_{BIST1}$, $X_{BIST2}$, $X_{BIST3}$ (each of which is represented by an arrow input into the multiplexer) and the counter outputs which are used as Y inputs will be denoted as: $Y_{BIST0}$, $Y_{BIST1}$, $Y_{BIST2}$, $Y_{BIST3}$ (each of which is represented by an arrow input into the multiplexer). During BIST, the multiplier array receives for every $0<=i<=N_x-1$, $X_i=X_{BIST(i\ mod\ 4)}$ and for every $0<=i<=N_y-1$, $Y_i=Y_{BIST(i\ mod\ 4)}$ (this is accomplished by the two sets of multiplexers shown in FIG. 3). During the application of the 256 test vectors produced by the counter, all the cells of the multiplier are tested exhaustively with all their input combinations that can appear during normal mode, except the $N_y-4$ rightmost half adders which receive 3 of their 4 possible input combinations (as shown in FIG. 2). This is valid for any length of the multiplier operands.

This is true because the input combinations of the three types of cells can be applied simultaneously in a repetitive manner (as will be shown below) to multiple cells of the same type in both the horizontal and vertical dimensions. The only exception is the one missing combination of the half adders that cannot be applied repetitively.

Regarding the half adders of the last row of FIG. 2, it can be shown that they cannot receive input combination $c_{in}=1$, a=0 in a repetitive manner. If this combinations is applied to one half adder, then no other half adder can receive it since $c_{in}=1$ cannot be reproduced in the row. Therefore, a number of test patterns which increases linearly with the length of the Y operand is required. In one preferred embodiment of the present invention, this problem is ovethis problem is overcome to obtain the full testability of the modified Booth multiplier.

The following describes how the test patterns produced by the 8-bit counter apply all possible input combinations to every cell of the multiplier except the set of half adders mentioned above.

r-cells: The r-cell of row $j(j=0,1,\ldots,$ $$\left\lceil\frac{N_x}{2}\right\rceil-1)$$

receives a group of 3 successive bits of the X operand ($X_{2j-1}$, $X_{2j}$, $X_{2j+1}$), and produce the group of recoding signals ($Sign_j$, $One_j$, $Two_j$). Since the 8-bit counter exhaustively covers groups of 4 successive bits of the X operand, this is also true for groups of 3 bits. Therefore, the r-cells are exhaustively tested. This is also true for the reduce 2-input r-cell of row 0.

pp-cells: The pp-cell at row j and column i($pp_{j,i}$) receives the group of recoding signals ($Sign_j$, $One_j$, $Two_j$) from the corresponding recoding cell of row j, along with two bits of the Y operand ($Y_i$, $Y_{i-1}$). For each value of the group of signals ($Sign_j$, $One_j$, $Two_j$), all of the 4 different combinations of the $Y_i$, $Y_{i-1}$ signals are provided to the cell by the counter since the counter exhaustively covers also 2-bits groups. Since all possible values of the group of signals ($Sign_j$, $One_j$, $Two_j$) are produced, each pp-cell is tested with respect to the previously described fault model. This is also true for the reduced 4-input pp-cells of columns 0 and $N_y$.

Adders: The following is a description of the structure of the adders array which demonstrates all possible input combinations that are applied to the adders of the array. These descriptions also apply to FIGS. 1 and 2.

1. the inputs of a full adder are denoted a,b,c, (from left to right) and the inputs of a half adder are denoted a,b (from left to right).
2. each adder (either full or half), except the adders of column 0, receives the carry-out line of the adder at its left at its a input.
3. the column 0 adders receive at the a input the corresponding $X_{2j+1}$, $j=0,1,\ldots,$ $$\left\lceil\frac{N_x}{2}\right\rceil-1$$

input signal.

4. the sum outputs of the adders that are driven to other adders, are connected to their b inputs.
5. a full adder at some row $j=1,2,\ldots,$ $$\left\lceil\frac{N_x}{2}\right\rceil-1,$$

which receives two partial product bits $pp_{j,i}$ and $pp_{j-1,i+2}$, receives the $pp_{j,i}$ bit at its b input and the $pp_{j-1,i+2}$ bit at its c input.

6. the carry-out of the adders at positions $(j,N_y), j=0,1,\ldots,$ $$\left\lceil\frac{N_x}{2}\right\rceil-2$$

are driven to the c input of the adders at positions $(j+1,N_y-1)$ 7. the sum outputs of the full adders at positions $(j,N_y-1)$, $j=0,1,\ldots,$ $$\left\lceil\frac{N_x}{2}\right\rceil-1$$

are driven to the c inputs of the full adders at positions $(j, N_y)$.

In the following attached Tables 1–9, for each different input combination that an adder must receive, a set of test vectors is shown that apply the input combination to all the adders of the array independently of the multiplier operands lengths. For all the test vectors, both the X and Y operands are described by a repeated binary pattern having a repetition length of 4 bits. Since the patterns produced by the 8-bit counter have the same property all the test vectors of Tables 1–9 are produced during the 256 cycles of the counter operation.

As will be seen in Tables 1–9, the notations $X_{Nx-1\ldots 0}=(b_3b_2b_1b_0)^*$ (or $Y_{Ny-1\ldots 0}=(b_3b_2b_1b_0)^*$) and $X_{0\ldots NX-1}=(b_3b_2b_1b_0)^*$ (or $Y_{0\ldots NY-1}=(b_3b_2b_1b_0)^*$) are used. Each of these notations denotes a repeated binary pattern. When $X_{Nx-1\ldots 0}$ (or $Y_{Nx-1\ldots 0}$) is used, it means that when the length of the X operand is not a multiple of four, the test pattern must be truncated at is low order bits. Otherwise, when $X_{0\ldots Nx-1}$ (or $Y_{0\ldots Ny-1}$) is used and the operand is not a multiple of four, the test pattern must be truncated at its high order bits. In both cases the 8-bit counter produces the required test vector and therefore, the method of the present invention can be applied to any length of multiplier operands.

Tables 1–8 give the test vectors applying all input combinations to the full adders. The input combinations are applied simultaneously to a number of full adder of the array. The distances between full adders that receive the same input combination are different for each combination. For example, input combination abc=000 is applied simultaneously to all the full adders (see Table 1), input combination abc=001 is applied with a vertical distance of 2 rows and horizontal distance of 1 column (see Table 3) and input combinations abc=111 and abc=100 are applied with various distances either in the vertical or the horizontal dimension (see Tables 7 and 8, respectively).

The four input combinations abc=000, abc=111, abc=001, and abc=110 are easily applied to the full adders as shown in Tables 1 to 4. To describe the application of the remaining four input combinations, the array of adders is separated in two parts, the "upper" part and the "lower" part. The diagonal dashed line in FIG. 2 shows the border between these two parts. An adder at position (j,i), j=0,1, . . . , $$\left\lceil \frac{N_x}{2} \right\rceil - 1,$$

i=0,1, . . . $N_y$ belongs to the "lower" part of the array if the relation i<=2

$$\left( \left\lceil \frac{N_x}{2} \right\rceil - j \right)$$

−1 holds.

Otherwise, it belongs to the "upper" part of the array. The diagonals of the "upper" part of the array are numbered 1,2, . . . from left to right. A diagonal is defined by the flow of the sum signals of the adders. Tables 5 to 8 give the test vectors that apply the remaining 4 input combinations to the full adders.

Table 9 gives the set of test vectors applying the input combinations to the half-adders of the bottom next row. The leftmost 5 half-adders receive all 4 input combinations. Half adders at columns from 5 to $N_{y\_1}$ receive the 3 input combinations 00,01,11 and half-adders at column $N_y$ receives the 3 input combinations 00,01,10.

In one embodiment of the present invention, the missing input combinations mentioned above are applied to the half-adders of the last row of FIG. 2. As those skilled in the art will recognize, this preferred embodiment will be used for high quality applications requirements.

First, it must be noted that it is relatively easy to verify that the missing input combinations can be applied to the half-adders of the last row if operand X receives values $X_0X_1 \ldots X_{Nx-2}X_{Nx-1}=01 \ldots 11$ and operand Y receives the following $N_y$ values:

```
1 0 0 0 ... 0
0 1 0 0 ... 0
0 0 1 0 ... 0
0 0 0 1 ... 0
: : : : : :
0 0 0 0 ... 1
```

Figure 4:
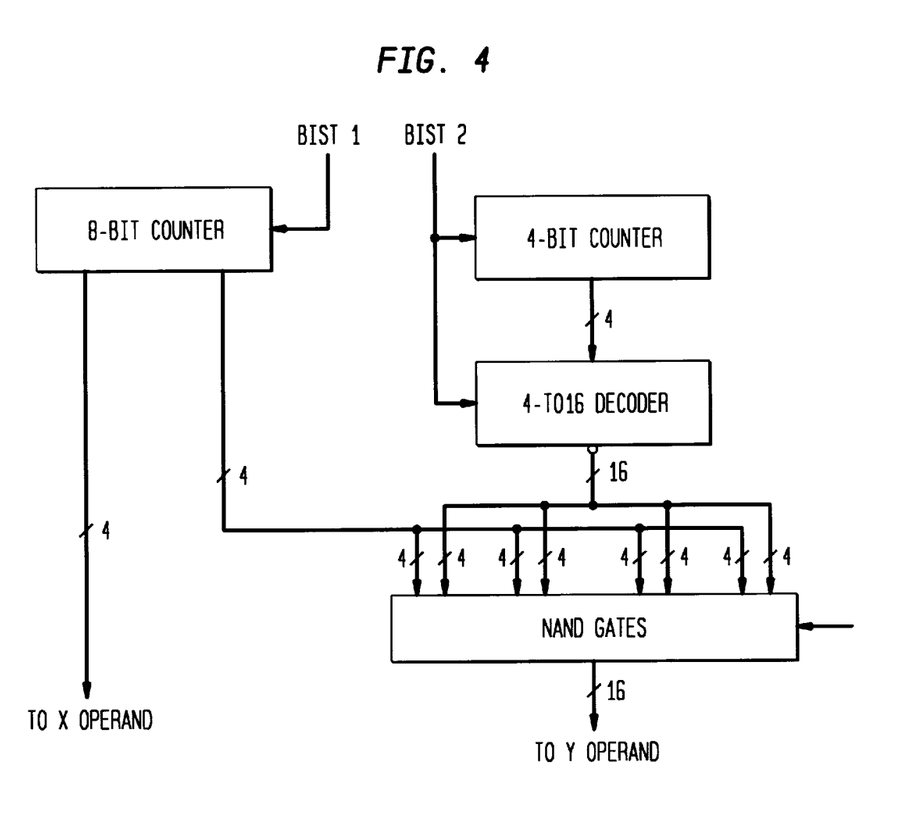
FIG. 4 is a block diagram of the BIST TPG to apply the missing half adder input combinations according to the present invention.

This sequence can be produced using a $\log_2 (N_y)$ -bit counter (labeled as 4-bit counter) and a $\log_2(N_y)$-to-$N_y$ decoder (labeled as 4-to-16 bit counter) as shown in FIG. 4 for the case $N_y$=16. The two parts of the TPG are enabled and disabled with 2 different inputs denoted $BIST_1$ and $BIST_2$. When either of the two parts is disabled it produces an all "1" word at its outputs, and the NAND gates allow the outputs of the other part to be fed to the multiplier (the inversion bubble at the 4-to-16 bit decoder output means that when an output is selected, it is set to "0", and all the other are set to "1"). Also note that while $BIST_2$ is active, the input register of the X operand must contain the value $X_0X_1 \ldots X_{Nx-2}X_{Nx-1}=01 \ldots 11$. This is done by connecting the $BIST_2$ line to a preset or clear inputs of the input register elements. Additionally, the multiplexers at the left side of the array (FIG. 3) must select the inputs coming from this X operand input register.

Apart from applying every possible input combination to all the cells of the multiplier, it must be ensured that any faulty cell output will be propagated towards primary outputs. All different cell types that can be faulty and all faulty cell outputs, therefore, must propagate towards these primary outputs. This will be described as follows for each type of cell.

r-cells: If the single faulty cell is the r-cell of row (j=0,1, . . . , $$\left\lceil \frac{N_x}{2} \right\rceil - 1 \bigg),$$

at least one of its three outputs $Sign_j$, $One_j$, $Two_j$ will be faulty. Since for every combination of these three signals all 4 different combinations of signals $Y_i, Y_{i-1}$ are applied to the pp-cells of the same row, the fault will be propagated to the single output of these cells. The fault is propagated by the least significant bit of the partial product of row j towards primary output $P_{2j}$ through a chain of adders (following the sum lines) as can be verified from FIG. 2.

pp-cells: if the single faulty cell is a pp-cell at row j(j=0.1, . . . , $$\left\lceil \frac{N_x}{2} \right\rceil - 1 \bigg)$$

and column i (i=0,1, . . . $N_y$), then since the single output of these cells drives an adder input the fault will be propagated through an adders cell chain (following the sum lines) at primary output $P_{2j+i}$.

Adders: when the single faulty cell is one of the adders (either a half or a full adder) the fault is propagated through a chain of adders, again following sum lines towards primary outputs.

The advantage of the 8-bit TPG according to the present invention is that it is not necessary to modify any cell of the multiplier itself. Simply, the signals at the periphery of the array (X and Y operands) need to be controlled by the multiplexers and 8-bit counter as shown in FIG. 3. Therefore, just an 8-bit counter module and a set of multiplexers are needed to feed the array from the counter outputs, and not from the normal primary inputs, as required by the other prior art methods.

Because hardware costs are very important for any BIST scheme and are important for those skilled in the art to fabricate a BIST device, a rough estimation of these hardware costs for the present invention are provided below in gate equivalents. For this, it is assumed that one full adder equals 10 gates, one half adder equals 5 gates, one r-cell equals 8 gates, one pp-cell equals 14 gates, one flip-flop equals 10 gates, one multiplexer equals 3 gates and one 2-input NAND gate equals 1 gate.

The original design of the multiplier consists of $$\left\lceil \frac{N_x}{2} \right\rceil$$

r-cells, $$\left\lceil \frac{N_x}{2} \right\rceil$$

* $(N_y+1)$ pp-cells, $$\left\lceil \frac{N_x}{2} \right\rceil - 1$$

* $(N_y+1)$ full adders and $N_y+1$ half-adders. If an accumulator is already part of the circuit in the original hardware size of the circuit, $N_x+N_y$ full adders and an equal number of flip-flops are added.

The above give for the original design (assuming that the accumulator already exists) a total number of:

$$2N_x + 15N_y + 32\left\lceil \frac{N_x}{2} \right\rceil + 24\left\lceil \frac{N_x}{2} \right\rceil N_y - 5$$

gates.

The BIST hardware for the basic 8-bit counter, consists of the 8-bit counter and a total of $N_x+N_y$ multiplexers, giving a total of:

$$3N_x+N_y+80$$

gates.

The hardware overhead is therefore:

$$HO = \frac{3Nx + 3Ny + 80}{2Nx + 15Ny + 32\left\lceil \frac{N_x}{2} \right\rceil + 24\left\lceil \frac{N_x}{2} \right\rceil Ny - 5}$$

The above formula gives for $N_x=N_y=16$, 32, 64, HO=4.89%, 2.04%, 0.91%, respectively.

If the enhanced TPG (described above in relation to the extra decoders added) is used, the extra hardware must include the cost of the $\log_2(N_y)$-bit counter the $\log_2(N_y)$-to-Ny decoder and the $N_y$ NAND gates. It is assumed that the 2-to-4 decoders (=5 gates) and the 3-to-8 decoders (=15 gates) are available and design all the other decoders may be used with these modules. For example, $N_x=N_y=16$ a 4-bit counter (=40 gates), a 4-to-16 decoder, designed using 5 2-to-4 decoders (=5×5=25 gates) and 16 NAND gates (=16 gates) may be used. This gives a total of 81 extra gates and a total hardware overhead of 7.15%. Using similar calculations for the cases $N_x=N_y=32,64$ that additional hardware is equal to 137,259 gates. The total hardware overhead for these cases is then 3.07% and 1.41% respectively.

In another embodiment of the present invention, output data compaction is used to obtain even greater fault coverage. Multiplier units, such as Booth multipliers are usually accompanied by accumulators in data path blocks and therefore, no extra hardware for the response verification is required. If a dedicated accumulator is synthesized for output data compaction, it does not require much design effort, due to its inherent regularity.

The fault-free final signature in the accumulator after the 256 test vectors have been applied is irrespective of the size of the multiplier, equal to 64. A simple proof for this fact is given in the following, based on the patterns produced by the 8-bit counter TPG of the present invention.

During each cycle of BIST, each operand takes the value of a repeated binary pattern of 4 bits. Therefore, the number of different values an operand receives is 16. These 16 values form 8 pairs $(V_k, V'_k)$ (k=1,2, ... 8) with the property $V_k = -V'_k - 1$. This is true because for each combination applied to either the X or the Y operand, the one's complement of the combination is also applied to the operand. During the application of the 256 test patterns, each of the 16 values of operand X is multiplied with each of the 16 values of operand Y. For value $Y_v$ of the Y operand, the result of multiplying this value with all the 16 values of operand X and accumulating the result is:

$$(V_1+V'_1+V_2+V'_2+V_3+V'_3+V_4+V'_4+V_5+V'_5+V_6+V'_6+V_7+V'_7+V_8+V'_8)Y_v =$$

$$((-1)+(-1)+(-1)+(-1)+(-1)+(-1)+(-1)+(-1))Y_v = -8*Y_v$$

Repeating the same for every $V_1, V'_1, V_2, V'_2, V_3, V'_3, V_4, V'_4, V_5, V'_5, V_6, V'_6, V_7, V'_7, V_8, V'_8$ results in:

$$(-8)V_1+(-8)V'_1+(-8)V_2+(-8)V'_2+(-8)V_3+(-8)V'_3+(-8)V_4+(-8)V'_4+$$

$$(-8)V_5+(-8)V'_5+(-8)V_6+(-8)V'_6+(-8)V_7+(-8)V'_7+(-8)V_8+V'_8=(-8)(V_1+V'_1+V_2+V'_2+V_3+V'_3+V_4+V'_4+V_5+V'_5+V_6+V'_6+V_7+V'_7+V_8+V'_8)=(-8)(-8)=64$$

The effectiveness of using count based output data compaction when employed in the BIST according to the present invention can be measured by fault simulation. The target of these measurements is to find the best solution to achieve a fault coverage for single stuck-at faults of more than 99% by reducing the aliasing caused by the count-based compactor.

If an accumulator already exists at the multiplier outputs, a small Design for Testability modification, according to the present invention, can be added to it to reduce aliasing. For example, the carry-out signal at the most significant position of the accumulator can be fed to the carry-in input at the least significant position of the accumulator making the accumulator work as a rotate carry adder, during BIST. This simple modification enables the count-based compaction have a similar aliasing probability with the best known compactors (for example MISRs). This promising solution has already been shown to improve the quality of the present invention.

The very small number of test vectors enables the periodic extraction of intermediate signatures to further reduce the aliasing of the compaction scheme. The shift-out of an intermediate signature takes a number of clock cycles equal to the size of the accumulator. Even for large multipliers, e.g. 64×64 bits, the shift-out of a few intermediate signatures according to the present invention does not make the test time larger than a few hundred clock cycles; however, it can greatly improve the quality of the test.

Figure 5:
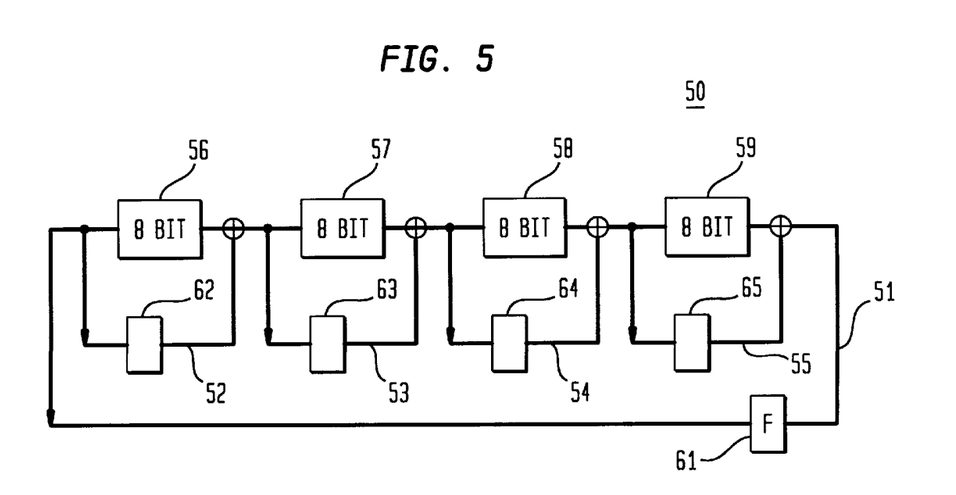
FIG. 5 is a circuit diagram of a multiple rotate carry accumulator.

In an another embodiment, the single rotate carry accumulator, described above, is replaced by a multiple rotate carry accumulator. One such accumulator 50 is shown in FIG. 5. As shown, multiple rotate carry accumulator 50 has a single feedback carry loop 51 and four inset carry loops 52–55 that divide the 32-bit accumulator 50 into four 8-bit segments 56–59. In operation, the carry out signal of each segment 56–59 is fed into its input Xored with the carry out signal of the previous segment. The feedback loops 51–55 are controlled by a set of memory elements 61–65 which are set to "0" during normal operating mode. Such a multiple rotate carry accumulator, when coupled with the test apparatus and method of the present invention, provides even greater fault coverage than the single rotate carry accumulator described above. Thus, it is apparent that other compaction schemes (even those not using an accumulator) can be used in conjunction with the principles of the present invention to achieve a desired fault coverage.

When an accumulator is not part of the circuit and the circuit must be modified to include it, another embodiment of the present invention would include adding a small accumulator (and thus a small hardware overhead) at the multiplier circuits. The accumulator captions one after the other equal-lengths parts of the multiplier outputs. The 256 test cycles are run multiple times to caption all the multiplier outputs. The solution of the rotate carry adder can also be useful in the present invention.

Accordingly, the present invention provides an effective BIST scheme for modified Booth multipliers. An 8-bit counter test pattern generator is used along with count based output data compaction. The fault model adopted enables a BIST algorithm which is independent of specific implementations of the multiplier cells. No Design-for-Testability modifications to the multiplier are required and the scheme is totally applied on the periphery of the multiplier structure, thereby, causing no internal performance degradation.

In case of multiple multipliers in an ASIC, more than one multiplier module can share the BIST hardware. The BIST scheme of the present invention is generic in the respect that it can be applied to any modified Booth multiplier, as well as other arithmetic regular structures. Therefore, although the present invention has been described with respect to its application to Booth multipliers, those skilled in the art would be able to apply the present invention to any number of other regular arithmetic structures. Accordingly, the breadth of the present invention should not be limited to Booth multipliers but by the appended claims.

TABLE 1

Full Adder Input Combination abc = 000

| Full adders that receive abc = 000 | Primary Inputs Test Vector |
|---|---|
| rows: $1, \ldots, \lceil \frac{N_x}{2} \rceil - 1$<br>columns: $0, \ldots, N_y$ | $X_{N_x-1 \ldots 0} = (0000)^*, Y_{N_y-1 \ldots 0} = (1000)^*$ |

TABLE 2

Full Adder Input Combination abc = 111

| Full adders that receive abc = 111 | Primary Inputs Test Vector |
|---|---|
| rows: $1, \ldots, \lceil \frac{N_x}{2} \rceil - 1$<br>columns: $0, \ldots, N_y - 3$ | $X_{N_x-1 \ldots 0} = (1010)^*, Y_{N_y-1 \ldots 0} = (0000)^*$ |
| rows: $1, \ldots, \lceil \frac{N_x}{2} \rceil - 1$<br>columns: $N_y - 2, \ldots, N_y$ | $X_{N_x-1 \ldots 0} = (1111)^*, Y_{N_y-1 \ldots 0} = (1000)^*$ |

TABLE 3

Full Adder Input Combination abc = 001

| Full adders that receive abc = 001 | Primary Inputs Test Vector |
|---|---|
| rows: $\lceil \frac{N_x}{2} \rceil - 1, \lceil \frac{N_x}{2} \rceil - 3, \lceil \frac{N_x}{2} \rceil - 5 \ldots$<br>columns: $0 \ldots N_y - 3$ | $X_{N_x-1 \ldots 0} = (0010)^*,$<br>$Y_{N_y-1 \ldots 0} = (0000)^*$ |
| rows: $\lceil \frac{N_x}{2} \rceil - 2, \lceil \frac{N_x}{2} \rceil - 4, \lceil \frac{N_x}{2} \rceil - 6 \ldots$<br>columns: $0 \ldots N_y - 3$ | $X_{N_x-1 \ldots 0} = (1000)^*,$<br>$Y_{N_y-1 \ldots 0} = (0000)^*$ |
| rows: $1 \ldots \lceil \frac{N_x}{2} \rceil - 1$<br>columns: $N_y - 2 \ldots N_y - 1$ | $X_{N_x-1 \ldots 0} = (0000)^*,$<br>$Y_{N_y-1 \ldots 0} = (0010)^*$ |
| rows: $\lceil \frac{N_x}{2} \rceil - 1, \lceil \frac{N_x}{2} \rceil - 3, \lceil \frac{N_x}{2} \rceil - 5 \ldots$<br>columns: $N_y$ | $X_{N_x-1 \ldots 0} = (1001)^*,$<br>$Y_{N_y-1 \ldots 0} = (0101)^*$ |
| rows: $\lceil \frac{N_x}{2} \rceil - 2, \lceil \frac{N_x}{2} \rceil - 4, \lceil \frac{N_x}{2} \rceil - 6 \ldots$<br>columns: $N_y$ | $X_{N_x-1 \ldots 0} = (1100)^*,$<br>$Y_{N_y-1 \ldots 0} = (1010)^*$ |

TABLE 4

Full Adder Input Combination abc = 110

| Full adders that receive abc = 001 | Primary Inputs Test Vector |
|---|---|
| rows: $\lceil \frac{N_x}{2} \rceil - 2, \lceil \frac{N_x}{2} \rceil - 4, \lceil \frac{N_x}{2} \rceil - 6 \ldots$<br>columns: $0 \ldots N_y - 3$ | $X_{N_x-1 \ldots 0} = (0010)^*,$<br>$Y_{N_y-1 \ldots 0} = (0000)^*$ |
| rows: $\lceil \frac{N_x}{2} \rceil - 1, \lceil \frac{N_x}{2} \rceil - 3, \lceil \frac{N_x}{2} \rceil - 5 \ldots$<br>columns: $0 \ldots N_y - 3$ | $X_{N_x-1 \ldots 0} = (1000)^*,$<br>$Y_{N_y-1 \ldots 0} = (0000)^*$ |
| rows: $1 \ldots \lceil \frac{N_x}{2} \rceil - 1$<br>columns: $N_y - 2 \ldots N_y - 1$ | $X_{N_x-1 \ldots 0} = (1111)^*,$<br>$Y_{N_y-1 \ldots 0} = (0001)^*$ |
| rows: $\lceil \frac{N_x}{2} \rceil - 1, \lceil \frac{N_x}{2} \rceil - 3, \lceil \frac{N_x}{2} \rceil - 5 \ldots$<br>columns: $N_y$ | $X_{N_x-1 \ldots 0} = (1010)^*,$<br>$Y_{N_y-1 \ldots 0} = (1001)^*$ |
| rows: $\lceil \frac{N_x}{2} \rceil - 2, \lceil \frac{N_x}{2} \rceil - 4, \lceil \frac{N_x}{2} \rceil - 6 \ldots$<br>columns: $N_y$ | $X_{N_x-1 \ldots 0} = (0011)^*,$<br>$Y_{N_y-1 \ldots 0} = (1010)^*$ |

TABLE 5

Full Adder Input Combination abc = 010

| Full adders that receive abc = 010 | Primary Inputs Test Vector |
|---|---|
| part: "lower" | |
| rows: $1 \ldots \lceil \frac{N_x}{2} \rceil - 1$ | |
| columns: $0, 1, 5, 9, \ldots$ | $X_{N_x-1 \ldots 0} = (0101)^*,$<br>$Y_{0 \ldots N_y-1} = (1100)^*$ |
| columns: $2, 3, 7, 11, \ldots$ | $X_{N_x-1 \ldots 0} = (0101)^*,$<br>$Y_{0 \ldots N_y-1} = (0011)^*$ |
| columns: $2, 4, 6, 8, \ldots$ | $X_{N_x-1 \ldots 0} = (1010)^*,$<br>$Y_{0 \ldots N_y-1} = (1111)^*$ |
| part: "upper" | $X_{N_x-1 \ldots 0} = (0001)^*,$<br>$Y_{0 \ldots N_y-1} = (1111)^*$ |
| rows: $\lceil \frac{N_x}{2} \rceil - 1, \lceil \frac{N_x}{2} \rceil - 3, \lceil \frac{N_x}{2} \rceil - 5, \ldots$ | |

TABLE 5-continued

Full Adder Input Combination abc = 010

| Full adders that receive abc = 010 | Primary Inputs Test Vector |
|---|---|
| columns: 2 ... $N_y - 2$<br>part: "upper" | $X_{N_x-1 \ldots 0} = (0100)^*$,<br>$Y_{0 \ldots N_y-1} = (1111)^*$ |
| rows: $\lceil \frac{N_x}{2} \rceil - 2, \lceil \frac{N_x}{2} \rceil - 4, \lceil \frac{N_x}{2} \rceil - 6, \ldots$<br>columns: 2 ... $N_y - 2$<br>part: "upper" | $X_{N_x-1 \ldots 0} = (1010)^*$,<br>$Y_{0 \ldots N_y-1} = (0110)^*$ |
| rows: all<br>columns: $N_y - 1$<br>part: "upper" | $X_{N_x-1 \ldots 0} = (1001)^*$,<br>$Y_{0 \ldots N_y-1} = (1010)^*$ |
| rows: all<br>columns: $N_y$ | |

TABLE 6

Full Adder Input Combination abc = 101

| Full adders that receive abc = 101 | Primary Inputs Test Vector |
|---|---|
| part: "lower"<br>rows: 1, 3, 5, ...<br>columns: 0, 1, (2, 4, 5), (6, 8, 9), ...<br>part: "lower" | $X_{N_x-1 \ldots 0} = (0111)^*$,<br>$Y_{0 \ldots N_y-1} = (1111)^*$ |
| rows: 1, 3, 5, ... | $X_{N_x-1 \ldots 0} = (1110)^*$,<br>$Y_{0 \ldots N_y-1} = (1111)^*$ |

TABLE 6-continued

Full Adder Input Combination abc = 101

| Full adders that receive abc = 101 | Primary Inputs Test Vector |
|---|---|
| columns: 0, 1, (2, 3, 5), (6, 7, 9) ...<br>part: "lower" | $X_{N_x-1 \ldots 0} = (1011)^*$,<br>$Y_{0 \ldots N_y-1} = (1111)^*$ |
| rows: 0, 2, 4, ...<br>columns: 0, 1, (2, 3, 5), (6, 7, 9), ...<br>part: "lower" | $X_{N_x-1 \ldots 0} = (1101)^*$,<br>$Y_{0 \ldots N_y-1} = (1111)^*$ |
| rows: 0, 2, 4, ...<br>columns: 0, 1, (2, 4, 5), (6, 8, 9) ...<br>part: "upper" | $X_{N_x-1 \ldots 0} = (1011)^*$,<br>$Y_{0 \ldots N_y-1} = (1111)^*$ |
| rows: $\lceil \frac{N_x}{2} \rceil - 1, \lceil \frac{N_x}{2} \rceil - 3, \lceil \frac{N_x}{2} \rceil - 5, \ldots$<br>columns: 2 ... $N_y - 2$<br>part: "upper" | $X_{N_x-1 \ldots 0} = (1110)^*$,<br>$Y_{0 \ldots N_y-1} = (1111)^*$ |
| rows: $\lceil \frac{N_x}{2} \rceil - 2, \lceil \frac{N_x}{2} \rceil - 4, \lceil \frac{N_x}{2} \rceil - 6, \ldots$<br>columns: 2 ... $N_y - 2$<br>part: "upper" | $X_{N_x-1 \ldots 0} = (1010)^*$,<br>$Y_{0 \ldots N_y-1} = (0110)^*$ |
| rows: all<br>columns: $N_y - 1$<br>part: "upper" | $X_{N_x-1 \ldots 0} = (1010)^*$,<br>$Y_{0 \ldots N_y-1} = (0000)^*$ |
| rows: all<br>columns: $N_y$ | |

TABLE 7

Full Adder Input Combination abc = 011

| Full adders that receive abc = 011 | Primary Inputs Test Vector |
|---|---|
| part: "lower"<br>rows: 1 ... $\lceil \frac{N_x}{2} \rceil - 1$ | |
| columns: 0 | $X_{N_x-1 \ldots 0} = (0101)^*, Y_{0 \ldots N_y-1} = (1011)^*$ |
| columns: 1, 5, 9, ... | $X_{N_x-1 \ldots 0} = (0101)^*, Y_{0 \ldots N_y-1} = (0101)^*$ |
| columns: 2, 6, 10, ... | $X_{N_x-1 \ldots 0} = (0101)^*, Y_{0 \ldots N_y-1} = (1100)^*$ |
| columns: 3, 7, 11, ... | $X_{N_x-1 \ldots 0} = (0101)^*, Y_{0 \ldots N_y-1} = (0110)^*$ |
| columns: 4, 8, 12, ...<br>part: "upper" | $X_{N_x-1 \ldots 0} = (1010)^*, Y_{0 \ldots N_y-1} = (1001)^*$ |
| rows: $\lceil \frac{N_x}{2} \rceil - 2, \lceil \frac{N_x}{2} \rceil - 6, \lceil \frac{N_x}{2} \rceil - 10, \ldots$ | |
| diagonals: 1, 5, 9, ... | $X_{N_x-1 \ldots 0} = (0100)^*, Y_{0 \ldots N_y-1} = (0010)^*$ |
| diagonals: 2, 6, 10, ... | $X_{N_x-1 \ldots 0} = (1011)^*, Y_{0 \ldots N_y-1} = (1110)^*$ |
| diagonals: 3, 7, 11, ... | $X_{N_x-1 \ldots 0} = (0100)^*, Y_{0 \ldots N_y-1} = (1000)^*$ |
| diagonals: 4, 8, 12, ...<br>part: "upper" | $X_{N_x-1 \ldots 0} = (0100)^*, Y_{0 \ldots N_y-1} = (0100)^*$ |
| rows: $\lceil \frac{N_x}{2} \rceil - 3, \lceil \frac{N_x}{2} \rceil - 7, \lceil \frac{N_x}{2} \rceil - 11, \ldots$ | |
| diagonals: 1, 5, 9, ... | $X_{N_x-1 \ldots 0} = (0001)^*, Y_{0 \ldots N_y-1} = (1000)^*$ |
| diagonals: 2, 6, 10, ... | $X_{N_x-1 \ldots 0} = (0001)^*, Y_{0 \ldots N_y-1} = (0100)^*$ |
| diagonals: 3, 7, 11, ... | $X_{N_x-1 \ldots 0} = (0001)^*, Y_{0 \ldots N_y-1} = (0010)^*$ |
| diagonals: 4, 8, 12, ... | $X_{N_x-1 \ldots 0} = (1110)^*, Y_{0 \ldots N_y-1} = (1110)^*$ |

TABLE 7-continued

Full Adder Input Combination abc = 011

| Full adders that receive abc = 011 | Primary Inputs Test Vector |
|---|---|
| part: "upper" | |
| rows: $\lceil \frac{N_x}{2} \rceil - 1, \lceil \frac{N_x}{2} \rceil - 4, \lceil \frac{N_x}{2} \rceil - 7, \ldots$ | |
| diagonals: 1, 3, 5, ... | $X_{N_x-1 \ldots 0} = (0010)^*, Y_{0 \ldots N_y-1} = (1010)^*$ |
| diagonals: 2, 4, 6, ... | $X_{N_x-1 \ldots 0} = (0111)^*, Y_{0 \ldots N_y-1} = (1010)^*$ |
| part: "upper" | |
| rows: $\lceil \frac{N_x}{2} \rceil - 3, \lceil \frac{N_x}{2} \rceil - 9, \lceil \frac{N_x}{2} \rceil - 15, \ldots$ | |
| diagonals: 1, 3, 5, ... | $X_{N_x-1 \ldots 0} = (0001)^*, Y_{0 \ldots N_y-1} = (1010)^*$ |
| diagonals: 2, 4, 6, ... | $X_{N_x-1 \ldots 0} = (1110)^*, Y_{0 \ldots N_y-1} = (1010)^*$ |
| part: "upper" | |
| rows: $\lceil \frac{N_x}{2} \rceil - 2, \lceil \frac{N_x}{2} \rceil - 8, \lceil \frac{N_x}{2} \rceil - 14, \ldots$ | |
| diagonals: 1, 3, 5, ... | $X_{N_x-1 \ldots 0} = (0100)^*, Y_{0 \ldots N_y-1} = (1010)^*$ |
| diagonals: 2, 4, 6, ... | $X_{N_x-1 \ldots 0} = (1011)^*, Y_{0 \ldots N_y-1} = (1010)^*$ |
| part: "upper" | $X_{N_x-1 \ldots 0} = (0011)^*, Y_{0 \ldots N_y-1} = (1000)^*$ |
| rows: $\left(\lceil \frac{N_x}{2} \rceil - 4, \lceil \frac{N_x}{2} \rceil - 5, \lceil \frac{N_x}{2} \rceil - 8, \lceil \frac{N_x}{2} \rceil - 11\right),$ | $X_{N_x-1 \ldots 0} = (0101)^*, Y_{0 \ldots N_y-1} = (1000)^*$ |
| | $X_{N_x-1 \ldots 0} = (1001)^*, Y_{0 \ldots N_y-1} = (1000)^*$ |
| | $X_{N_x-1 \ldots 0} = (1100)^*, Y_{0 \ldots N_y-1} = (1000)^*$ |
| $\left(\lceil \frac{N_x}{2} \rceil - 14, \lceil \frac{N_x}{2} \rceil - 15, \lceil \frac{N_x}{2} \rceil - 18, \lceil \frac{N_x}{2} \rceil - 21\right)\ldots$ | $X_{N_x-1 \ldots 0} = (0110)^*, Y_{0 \ldots N_y-1} = (0100)^*$ |
| | $X_{N_x-1 \ldots 0} = (1001)^*, Y_{0 \ldots N_y-1} = (0100)^*$ |
| part: "upper" | $X_{N_x-1 \ldots 0} = (0001)^*, Y_{0 \ldots N_y-1} = (1100)^*$ |
| rows: $\left(\lceil \frac{N_x}{2} \rceil - 3, \lceil \frac{N_x}{2} \rceil - 5, \lceil \frac{N_x}{2} \rceil - 7\right),$ | $X_{N_x-1 \ldots 0} = (1110)^*, Y_{0 \ldots N_y-1} = (1100)^*$ |
| | $X_{N_x-1 \ldots 0} = (0001)^*, Y_{0 \ldots N_y-1} = (0110)^*$ |
| $\left(\lceil \frac{N_x}{2} \rceil - 13, \lceil \frac{N_x}{2} \rceil - 15, \lceil \frac{N_x}{2} \rceil - 17\right)\ldots$ | $X_{N_x-1 \ldots 0} = (1110)^*, Y_{0 \ldots N_y-1} = (0110)^*$ |
| part: "upper" | $X_{N_x-1 \ldots 0} = (0100)^*, Y_{0 \ldots N_y-1} = (1100)^*$ |
| rows: $\left(\lceil \frac{N_x}{2} \rceil - 2, \lceil \frac{N_x}{2} \rceil - 4, \lceil \frac{N_x}{2} \rceil - 6\right),$ | $X_{N_x-1 \ldots 0} = (1011)^*, Y_{0 \ldots N_y-1} = (1100)^*$ |
| | $X_{N_x-1 \ldots 0} = (0100)^*, Y_{0 \ldots N_y-1} = (0110)^*$ |
| $\left(\lceil \frac{N_x}{2} \rceil - 12, \lceil \frac{N_x}{2} \rceil - 14, \lceil \frac{N_x}{2} \rceil - 16\right)\ldots$ | $X_{N_x-1 \ldots 0} = (1011)^*, Y_{0 \ldots N_y-1} = (0110)^*$ |
| part: "upper" | $X_{N_x-1 \ldots 0} = (0011)^*, Y_{0 \ldots N_y-1} = (1100)^*$ |
| rows: $\left(\lceil \frac{N_x}{2} \rceil - 3, \lceil \frac{N_x}{2} \rceil - 4, \lceil \frac{N_x}{2} \rceil - 6\right),$ | $X_{N_x-1 \ldots 0} = (0110)^*, Y_{0 \ldots N_y-1} = (1100)^*$ |
| | $X_{N_x-1 \ldots 0} = (1001)^*, Y_{0 \ldots N_y-1} = (1100)^*$ |
| $\left(\lceil \frac{N_x}{2} \rceil - 8, \lceil \frac{N_x}{2} \rceil - 9, \lceil \frac{N_x}{2} \rceil - 11\right),$ | $X_{N_x-1 \ldots 0} = (1100)^*, Y_{0 \ldots N_y-1} = (1100)^*$ |
| $\left(\lceil \frac{N_x}{2} \rceil - 13, \lceil \frac{N_x}{2} \rceil - 14, \lceil \frac{N_x}{2} \rceil - 16\right)\ldots$ | $X_{N_x-1 \ldots 0} = (0011)^*, Y_{0 \ldots N_y-1} = (1001)^*$ |

TABLE 8

Full Adder Input Combination abc = 100

| Full adders that receive abc = 100 | Primary Inputs Test Vector |
|---|---|
| part: "lower" | |
| rows: $1 \ldots \lceil \frac{N_x}{2} \rceil - 1$ | |
| columns: 0 | $X_{N_x-1 \ldots 0} = (1010)^*, Y_{0 \ldots N_y-1} = (1111)^*$ |
| columns: 1 | $X_{N_x-1 \ldots 0} = (0010)^*, Y_{0 \ldots N_y-1} = (1010)^*$ |

TABLE 8-continued

Full Adder Input Combination abc = 100

| Full adders that receive abc = 100 | Primary Inputs Test Vector |
|---|---|
| columns: 2, 6, 10, ... | $X_{N_x-1 \ldots 0} = (1010)^*, Y_{0 \ldots N_y-1} = (1001)^*$ |
| columns: 3, 7, 11, ... | $X_{N_x-1 \ldots 0} = (1010)^*, Y_{0 \ldots N_y-1} = (0110)^*$ |
| columns: 4, 8, 12, ... | $X_{N_x-1 \ldots 0} = (0101)^*, Y_{0 \ldots N_y-1} = (1100)^*$ |
| columns: 5, 9, 13 ... | $X_{N_x-1 \ldots 0} = (0101)^*, Y_{0 \ldots N_y-1} = (0110)^*$ |
| part: "upper" | |
| rows: $\lceil \frac{N_x}{2} \rceil - 2, \lceil \frac{N_x}{2} \rceil - 6, \lceil \frac{N_x}{2} \rceil - 10, \ldots$ | |
| diagonals: 1, 5, 9, ... | $X_{N_x-1 \ldots 0} = (0100)^*, Y_{0 \ldots N_y-1} = (0100)^*$ |
| diagonals: 2, 6, 10, ... | $X_{N_x-1 \ldots 0} = (0100)^*, Y_{0 \ldots N_y-1} = (0010)^*$ |
| diagonals: 3, 7, 11, ... | $X_{N_x-1 \ldots 0} = (1011)^*, Y_{0 \ldots N_y-1} = (1110)^*$ |
| diagonals: 4, 8, 12, ... | $X_{N_x-1 \ldots 0} = (0100)^*, Y_{0 \ldots N_y-1} = (1000)^*$ |
| part: "upper" | |
| rows: $\lceil \frac{N_x}{2} \rceil - 3, \lceil \frac{N_x}{2} \rceil - 7, \lceil \frac{N_x}{2} \rceil - 11, \ldots$ | |
| diagonals: 1, 5, 9, ... | $X_{N_x-1 \ldots 0} = (1110)^*, Y_{0 \ldots N_y-1} = (1110)^*$ |
| diagonals: 2, 6, 10, ... | $X_{N_x-1 \ldots 0} = (0001)^*, Y_{0 \ldots N_y-1} = (1000)^*$ |
| diagonals: 3, 7, 11, ... | $X_{N_x-1 \ldots 0} = (0001)^*, Y_{0 \ldots N_y-1} = (0100)^*$ |
| diagonals: 4, 8, 12, ... | $X_{N_x-1 \ldots 0} = (0001)^*, Y_{0 \ldots N_y-1} = (0010)^*$ |
| part: "upper" | |
| rows: $\lceil \frac{N_x}{2} \rceil - 1, \lceil \frac{N_x}{2} \rceil - 4, \lceil \frac{N_x}{2} \rceil - 7, \ldots$ | |
| diagonals: 1, 3, 5, ... | $X_{N_x-1 \ldots 0} = (0111)^*, Y_{0 \ldots N_y-1} = (1010)^*$ |
| diagonals: 2, 4, 6, ... | $X_{N_x-1 \ldots 0} = (0010)^*, Y_{0 \ldots N_y-1} = (1010)^*$ |
| part: "upper" | |
| rows: $\lceil \frac{N_x}{2} \rceil - 3, \lceil \frac{N_x}{2} \rceil - 9, \lceil \frac{N_x}{2} \rceil - 15, \ldots$ | |
| diagonals: 1, 3, 5, ... | $X_{N_x-1 \ldots 0} = (1110)^*, Y_{0 \ldots N_y-1} = (1010)^*$ |
| diagonals: 2, 4, 6, ... | $X_{N_x-1 \ldots 0} = (0001)^*, Y_{0 \ldots N_y-1} = (1010)^*$ |
| part: "upper" | |
| rows: $\lceil \frac{N_x}{2} \rceil - 2, \lceil \frac{N_x}{2} \rceil - 8, \lceil \frac{N_x}{2} \rceil - 14, \ldots$ | |
| diagonals: 1, 3, 5, ... | $X_{N_x-1 \ldots 0} = (1011)^*, Y_{0 \ldots N_y-1} = (1010)^*$ |
| diagonals: 2, 4, 6, ... | $X_{N_x-1 \ldots 0} = (0100)^*, Y_{0 \ldots N_y-1} = (1010)^*$ |
| part: "upper" | $X_{N_x-1 \ldots 0} = (0011)^*, Y_{0 \ldots N_y-1} = (1000)^*$ |
| rows: $\left(\lceil \frac{N_x}{2} \rceil - 4, \lceil \frac{N_x}{2} \rceil - 5, \lceil \frac{N_x}{2} \rceil - 8, \lceil \frac{N_x}{2} \rceil - 11\right),$ $\left(\lceil \frac{N_x}{2} \rceil - 14, \lceil \frac{N_x}{2} \rceil - 15, \lceil \frac{N_x}{2} \rceil - 18, \lceil \frac{N_x}{2} \rceil - 21\right) \ldots$ | $X_{N_x-1 \ldots 0} = (0101)^*, Y_{0 \ldots N_y-1} = (1000)^*$ $X_{N_x-1 \ldots 0} = (1001)^*, Y_{0 \ldots N_y-1} = (1000)^*$ $X_{N_x-1 \ldots 0} = (1100)^*, Y_{0 \ldots N_y-1} = (1000)^*$ $X_{N_x-1 \ldots 0} = (0110)^*, Y_{0 \ldots N_y-1} = (0100)^*$ $X_{N_x-1 \ldots 0} = (1001)^*, Y_{0 \ldots N_y-1} = (0100)^*$ |
| part: "upper" | $X_{N_x-1 \ldots 0} = (0001)^*, Y_{0 \ldots N_y-1} = (1100)^*$ |
| rows: $\left(\lceil \frac{N_x}{2} \rceil - 3, \lceil \frac{N_x}{2} \rceil - 5, \lceil \frac{N_x}{2} \rceil - 7\right),$ $\left(\lceil \frac{N_x}{2} \rceil - 13, \lceil \frac{N_x}{2} \rceil - 15, \lceil \frac{N_x}{2} \rceil - 17\right) \ldots$ | $X_{N_x-1 \ldots 0} = (1110)^*, Y_{0 \ldots N_y-1} = (1100)^*$ $X_{N_x-1 \ldots 0} = (0001)^*, Y_{0 \ldots N_y-1} = (0110)^*$ $X_{N_x-1 \ldots 0} = (1110)^*, Y_{0 \ldots N_y-1} = (0110)^*$ |
| part: "upper" | $X_{N_x-1 \ldots 0} = (0100)^*, Y_{0 \ldots N_y-1} = (1100)^*$ |
| rows: $\left(\lceil \frac{N_x}{2} \rceil - 2, \lceil \frac{N_x}{2} \rceil - 4, \lceil \frac{N_x}{2} \rceil - 6\right),$ $\left(\lceil \frac{N_x}{2} \rceil - 12, \lceil \frac{N_x}{2} \rceil - 14, \lceil \frac{N_x}{2} \rceil - 16\right) \ldots$ | $X_{N_x-1 \ldots 0} = (1011)^*, Y_{0 \ldots N_y-1} = (1100)^*$ $X_{N_x-1 \ldots 0} = (0100)^*, Y_{0 \ldots N_y-1} = (0110)^*$ $X_{N_x-1 \ldots 0} = (1011)^*, Y_{0 \ldots N_y-1} = (0110)^*$ |
| part: "upper" | $X_{N_x-1 \ldots 0} = (0011)^*, Y_{0 \ldots N_y-1} = (1100)^*$ |

TABLE 8-continued

Full Adder Input Combination abc = 100

| Full adders that receive abc = 100 | Primary Inputs Test Vector |
|---|---|
| rows: $\left(\left\lceil\frac{N_x}{2}\right\rceil - 3, \left\lceil\frac{N_x}{2}\right\rceil - 4, \left\lceil\frac{N_x}{2}\right\rceil - 6\right)$, $\left(\left\lceil\frac{N_x}{2}\right\rceil - 8, \left\lceil\frac{N_x}{2}\right\rceil - 9, \left\lceil\frac{N_x}{2}\right\rceil - 11\right)$, $\left(\left\lceil\frac{N_x}{2}\right\rceil - 13, \left\lceil\frac{N_x}{2}\right\rceil - 14, \left\lceil\frac{N_x}{2}\right\rceil - 16\right)\ldots$ | $X_{N_x-1\ldots0} = (0110)^*, Y_{0\ldots N_y-1} = (1100)^*$ $X_{N_x-1\ldots0} = (1001)^*, Y_{0\ldots N_y-1} = (1100)^*$ $X_{N_x-1\ldots0} = (1100)^*, Y_{0\ldots N_y-1} = (1100)^*$ $X_{N_x-1\ldots0} = (0011)^*, Y_{0\ldots N_y-1} = (1001)^*$ |

TABLE 9

Half Adder Input Combination

| Combination | Half adders that receive combination | Primary Inputs Test Vector |
|---|---|---|
| ab = 00 | columns: $0 \ldots N_y - 1$ | $X_0 \ldots N_z - 1 = (0000)^*$, $Y_0 \ldots N_y - 1 = (0000)^*$ |
|  | columns: $N_y$ | $X_0 \ldots N_z - 1 = (1101)^*$, $Y_0 \ldots N_y - 1 = (1100)^*$ |
| ab = 11 | columns: $0 \ldots N_y - 1$ | $X_0 \ldots N_z - 1 = (1101)^*$, $Y_0 \ldots N_y - 1 = (0000)^*$ |
| ab = 01 | columns: 0 | $X_0 \ldots N_z - 1 = (1000)^*$, $Y_0 \ldots N_y - 1 = (1000)^*$ |
| ab = 01 | columns: 1,3,5 … | $X_0 \ldots N_z - 1 = (1111)^*$, $Y_0 \ldots N_y - 1 = (1010)^*$ |
| ab = 01 | columns: 2,4,6 … | $X_0 \ldots N_z - 1 = (1111)^*$, $Y_0 \ldots N_y - 1 = (0101)^*$ |
| ab = 10 | columns: 0 | $X_0 \ldots N_z - 1 = (1100)^*$, $Y_0 \ldots N_y - 1 = (1000)^*$ |
| ab = 10 | columns: 1 | $X_0 \ldots N_z - 1 = (0100)^*$, $Y_0 \ldots N_y - 1 = (1000)^*$ |
| ab = 10 | columns: 2 | $X_0 \ldots N_z - 1 = (0100)^*$, $Y_0 \ldots N_y - 1 = (0100)^*$ |
| ab = 10 | columns: 3 | $X_0 \ldots N_z - 1 = (0010)^*$, $Y_0 \ldots N_y - 1 = (0010)^*$ |
| ab = 10 | columns: 4 | $X_0 \ldots N_z - 1 = (0100)^*$, $Y_0 \ldots N_y - 1 = (0001)^*$ |
| ab = 10 | columns: $N_y$ | $X_0 \ldots N_z - 1 = (0100)^*$, $Y_0 \ldots N_y - 1 = (0000)^*$ |

What is claimed is:

1. In a system having an embedded structure for performing an operation on a given set of possible parameters, a method for testing the operation of the embedded structure comprising the steps of:

inputting a fixed test pattern at the system operation speed from a test pattern generator to the embedded structure to obtain an output of the embedded structure, said fixed test pattern including a substantial portion of the set of possible parameters, said output of the embedded structure including an output value for each parameter of said test pattern input; and checking said output values to obtain a specified fault coverage of the operation of the embedded structure.

2. The method of claim 1 wherein said test pattern generator comprises an 8-bit counter electrically coupled to a set of multiplexers, wherein one multiplexer is coupled to registers containing one set of operands, and wherein the other multiplexer is coupled to registers containing another set of operands.

3. The method of claim 2 wherein said mulitplexers are operable to controllably input said fixed test pattern to said embedded structure during one time period to test the embedded structure operation, and wherein said multiplexers are operable to controllably input said operands from said registers to said embedded structure at another time period to perform a given operation.

4. The method of claim 1 wherein said test pattern generator is a linear feedback shift register.

5. The method of claim 1 wherein said checking of said output values is performed through an accumulator.

6. The method of claim 5 wherein said accumulator is a single rotate carry accumulator.

7. The method of claim 5 wherein said accumulator is a multiple rotate carry accumulator.

8. The method of claim 1 wherein said test pattern generator is an 8-bit linear feedback register.

9. A Built In Self Test (BIST) device comprising:

a regular arithmetic structure to be tested, wherein the regular arithmetic structure uses carry propagate adder arrays to add partial products and wherein the regular arithmetic structure is comprised of at least two cell means that perform an arithmetic operation;

Test Pattern Generator (TPG) means externally coupled to the regular arithmetic structure, wherein the TPG is operable to generate a set of test vectors to enable external testing of a substantial portion of all inputs to the cells of the regular arithmetic structure; and multiplexer means coupled to an output of the TPG means and an input to the regular arithmetic structure.

10. The BIST device of claim 9 wherein the regular arithmetic structure is a modified Booth multiplier and the TPG means is an 8-bit counter.

11. The BIST device of claim 10 wherein the Booth multiplier comprises recoding cells, partial product cells and adder cells, wherein the recoding cells and the partial product cells receive every input combination possible in a normal mode from the 8-bit counter.

12. The BIST device of claim 11 wherein a first 4 outputs of the 8-bit counter are coupled to a first multiplier of a first operand for the Booth multiplier and a second 4 outputs of the 8-bit counter are coupled to a second multiplier of a second operand for the Booth multiplier.

13. The BIST device of claim 12 wherein the 8-bit counter cycles 256 times.

14. The BIST device of claim 12 wherein the recoding cells have three inputs and all 8 combinations of the three inputs are tested externally and wherein the partial product cells receive from the recoding cells a set of 3 recoded digits and wherein all combinations of each recoded digit is tested by the TPG means.

15. The BIST device of claim 12 wherein the Booth multiplier further comprises half adder cells to apply any missing input combinations of the adder cells.

16. The BIST device of claim 10 further comprising an accumulator which compacts output data from the Booth Multiplier to achieve a given fault coverage.

17. The BIST device of claim 16 wherein said accumulator is a single rotate carry accumulator.

18. The BIST device of claim 17 wherein said accumulator is a multiple rotate carry accumulator.

19. The BIST device of claim 10 wherein the Booth multiplier requires at least a first and second operand; wherein an 8-bit counter is coupled to an input of Booth multiplier for the first operand and at least two decoders coupled to an array of NAND gates are coupled to an input of the Booth multiplier for the second operand.

20. A logic test article comprising:
a regular arithmetic structure to be tested, wherein the regular arithmetic structure uses carry propagate adder arrays to add partial products and wherein the regular arithmetic structure is comprised of at least two cells means that perform arithmetic operations;

Test Pattern Generator (TPG) means externally coupled to the regular arithmetic structure, wherein the TPG is operable to generate a set of test vectors to enable external testing of a substantial portion of all inputs to the cells of the regular arithmetic structure; and multiplexer means coupled to an output of the TPG means and an input to the regular arithmetic structure.

21. The article of claim 20 wherein the regular arithmetic structure is a modified Booth multiplier and the TPG means is an 8-bit counter.

22. The article of claim 21 wherein the Booth multiplier comprises recoding cells, partial product cells and adder cells, wherein the recoding cells and the partial product cells receive every input combination possible in a normal mode from the 8-bit counter.

23. The article of claim 22 wherein a first 4 outputs of the 8-bit counter are coupled to a first multiplier of a first operand for the Booth multiplier and a second 4 outputs of the 8-bit counter are coupled to a second multiplier of a second operand for the Booth multiplier.

24. The article of claim 23 wherein the 8-bit counter cycles 256 times.

25. The article of claim 24 wherein the recoding cells have three inputs and all 8 combinations of the three inputs are tested externally and wherein the partial product cells receive from the recoding cells a set of 3 recoded digits and wherein all combinations of each recoded digit is tested by the TPG means.

26. The article of claim 22 wherein the Booth multiplier further comprises half adder cells to apply any missing input combinations of the adder cells.

27. The article of claim 21 further comprising an accumulator which compacts output data from the Booth Multiplier.

28. The article of claim 21 wherein the Booth multiplier requires at least a first and second operand; wherein an 8-bit counter is coupled to an input of Booth multiplier for the first operand and at least two decoders coupled to an array of NAND gates are coupled to an input of the Booth multiplier for the second operand.

29. The logic test article of claim 20 wherein said TPG means is an 8-bit linear feedback register.

30. A method of self testing a regular arithmetic structure comprising the steps of:
providing a regular arithmetic structure to be tested, wherein the regular arithmetic structure carry propagates adder arrays to add partial products and wherein the regular arithmetic structure includes at least two cells means that perform arithmetic operations;

externally coupling Test Pattern Generator (TPG) means to the regular arithmetic structure;

coupling a multiplexer means to the TPG to provide an input to the regular arithmetic structure; and generating from the TPG means a set of test vectors to enable external testing of a substantial portion of all inputs to the cells of the regular arithmetic structure.

31. The method claim 30 wherein the regular arithmetic structure is a modified Booth multiplier and the TPG means is an 8-bit counter.

32. The method of claim 31 wherein the Booth multiplier includes the steps of recoding an input, providing a partial product of the recoded input and adding the partial products in a predetermined manner, wherein every input combination of the steps of recoding the input and providing the partial product in a normal mode are provided from an 8-bit counter.

33. The method of claim 32 further comprising the steps of coupling a first 4 outputs of the 8-bit counter are to a first multiplier of a first operand for the Booth multiplier and coupling a second 4 outputs of the 8-bit counter to a second multiplier of a second operand for the Booth multiplier.

34. The method of claim 33 wherein the 8-bit counter cycles 256 times.

35. The method of claim 34 wherein the recoding cells have three inputs and all 8 combinations of the three inputs are tested externally and wherein the partial product cells receive from the recoding cells a set of 3 recoded digits and wherein all combinations of each recoded digit is tested by the TPG means.

36. The method of claim 31 further comprising the steps of applying half adder cells to the Booth multiplier to apply any missing input combinations of the adder cells.

37. The method of claim 30 further comprising the steps of providing an accumulator to an output of the Booth multiplier to compacts output data from the Booth Multiplier.

38. The method of claim 30 wherein the Booth multiplier requires at least a first and second operand; and further comprising the steps of coupling an 8-bit counter to an input of Booth multiplier for the first operand and coupling at least two decoders to an array of NAND gates which are in turn coupled to an input of the Booth multiplier for the second operand.

39. The method of claim 30 wherein said TPG means is an 8-bit linear feedback register.

* * * * *